Feb. 11, 1969     D. W. COLE ETAL     3,427,076

WHEEL BALANCER WITH INTEGRAL ATTACHING TABS

Filed June 28, 1967

INVENTORS
DONALD W. COLE
ARLAN E. MITCHELL
BEAUFORD I. WHITLOCK

ATTORNEY

United States Patent Office 3,427,076
Patented Feb. 11, 1969

3,427,076
WHEEL BALANCER WITH INTEGRAL ATTACHING TABS
Donald W. Cole, Fort Worth, Tex., and Arlan E. Mitchell and Beauford I. Whitlock, Stafford, Kans., assignors to AWB Manufacturing Co., Inc., Stafford, Kans., a corporation of Kansas
Filed June 28, 1967, Ser. No. 649,508
U.S. Cl. 301—5                                4 Claims
Int. Cl. B60b *13/00;* B60r *19/00*

ABSTRACT OF THE DISCLOSURE

A plastic annular casing containing plural weight means and a damping fluid has a plurality of tabs extending therefrom parallel to the longitudinal axis of the casing. The tabs are circumferentially spaced on the casing so that they may be inserted into narrow ports spaced circumferentially about the face of an automobile wheel. The tabs are arcuate in cross section and the radial thickness of the tabs is greater than the radial width of the ports. Insertion of the tabs into wheel ports causes deformation of the tabs creating forces at the points of contact of the tabs and the wheel face which serve to maintain the casing attached to the wheel.

The casing may have a circular cross section or, if it is desired to reduce the axial dimension of the balancer to provide space for a wheel cover or the like, it may have a semicircular cross section. The casing is provided with an outlet and a threaded plug for the outlet to facilitate addition or removal of weight means or fluid.

FIELD OF THE INVENTION

This invention relates generally to the dynamic balancing of rotating bodies, and more particularly, but not by way of limitation, to improved dynamic wheel balancers for automobiles.

THE PRIOR ART

It has long been known that dynamic balancing of a rotating body may be achieved by attaching to the rotating body an annular casing containing weights and a damping fluid. As the body rotates, the weights are distributed in the casing so that the center of mass of the body and attached balancer coincides with the center of rotation.

Various ways of securing such an annular casing to an automobile wheel have been attempted. Some previous designs provide for special brackets to be attached to wheels to receive balancer tubes. Others require that a plurality of clips be employed to fix the annular casing to an automobile wheel.

Still others have suggested various ways of mounting the annular balancing tube on the inside of the wheel adjacent the brake drum.

These previously known devices share the common disadvantage of inconvenience and impracticality in the installation and removal of the balancer. All require a number of steps to accomplish such installation or removal. Many require a plurality of component, interfitting parts.

Further, balancers which must be mounted adjacent the inner face of the wheel are subjected to the considerable heat generated there. Such heat reduces the viscosity of the damping fluid, and reduces the range of materials from which the casing may be formed.

SUMMARY

The present invention provides a unitary dynamic balancer which may be mounted on the outer face of an automobile wheel in one simple step.

An annular casing is formed from plastic, with a plurality of tabs extending parallel to the longitudinal axis thereof. The tabs are spaced circumferentially about the casing so that they correspond with the narrow, circumferentially spaced ports on the face of the wheel to which the balancer is to be secured.

The tabs are arcuate in cross section, so that they must flex when inserted into the ports. More particularly, the radial thickness of the tabs must be greater than the radial width of the ports.

Insertion of the tabs into the wheel ports, and their subsequent deformation, creates forces at the points of contact between the tabs and the wheel. These forces restrain the tabs in the ports, thus securing the annular casing to the wheel.

The casing typically is of circular cross section, but it is possible to provide other configurations. For example, if it is desired to lessen the space occupied by the balancer in the axial direction in order to make room for a wheel cover, the casing may have a semi-circular cross section.

The casing is provided with an outlet to permit introduction or removal of weight means or fluid as desired.

THE DRAWINGS

For a more complete understanding of the present invention and for further objects and advantages thereof, reference may now be had to the following description taken in conjunction with the accompanying drawings, in which.

THE PREFERRED EMBODIMENTS

Figure 1:
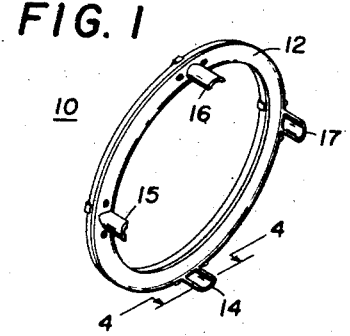
FIGURE 1 is a perspective view of one embodiment of the present invention.

Shown in FIGURE 1 is a balancer generally indicated by the reference numeral 10. The balancer 10 may be formed from a flexible plastic.

With reference to FIGURE 1, balancer 10 has an annular casing 12 provided with a plurality of circumferentially spaced tabs 14–17. The tabs 14–17 extend outward from the casing 12, parallel to the longitudinal axis of casing 12. The tabs 14–17 are relatively thin, and have a generally arcuate cross section.

Figure 2:
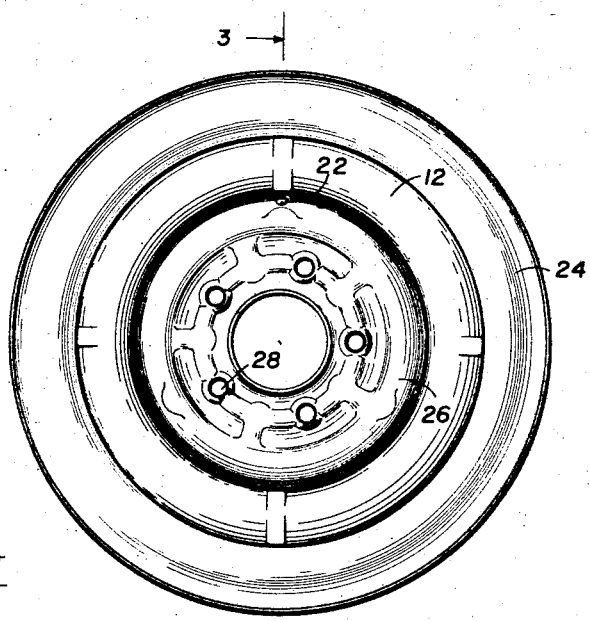
FIGURE 2 is an elevational view of the embodiment of FIGURE 1 installed on an automobile wheel.

As best illustrated in FIGURE 2, the casing 12 is provided with a threaded outlet which receives a plug 22. Plug 22 may be removed to permit damping fluid and/or weight means to be added to or taken from the casing 12.

The wheel to which balancer 10 is shown mounted in FIGURE 2 has a rim 24, a mounting plate 26, and conventional lug bolt holes 28.

Figure 3:
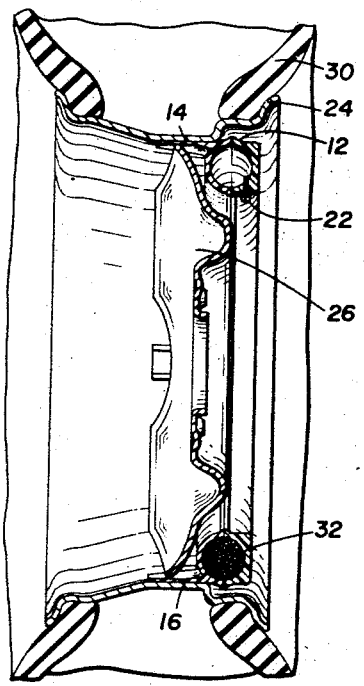
FIGURE 3 is a sectional view taken along line 3—3 of FIGURE 2.

The operational position of the balancer on the wheel is best illustrated in the sectional view of FIGURE 3. FIGURE 3 is taken along the section lines 3—3 of FIGURE 2, with the exception that a tire 30, not shown in FIGURE 2, is shown mounted on the wheel rim 24 in FIGURE 3. Casing 22 is shown containing plural weight means, such as the steel shot 32, which are surrounded by a suitable damping fluid, such as glycerine, ethylene glycol, transmission fluid or brake fluid.

In a typical construction of a wheel, plate 26 in welded into position on the rim 24. The plate 26 is often partially cut away about its circumference, so that very narrow ports are spaced about the line of contact between rim 24 and plate 26. Such a cut gives greater strength to the combination of rim 24 and plate 26.

Balancer 10 is adapted for use on wheels having four of such ports spaced evenly about the circumference of the plate 26. Tabs 14 and 16 of balancer 10 are inserted into two of such ports, as shown in FIGURE 3.

The tabs 14 and 16, normally arcuate, are flattened somewhat upon their insertion into the narrow ports. The elasticity of the tabs 14 and 16, coupled with their deformation on insertion into the ports, creates forces at the points of contact between the tabs 14 and 16 on one hand, and the wheel rim 24 and wheel plate 26 on the other.

These forces retain tabs 14 and 16 in their positions against the rim 24 and plate 26. Thus, the casing 12 is maintained in a concentric position on the wheel during operation.

Figure 4:
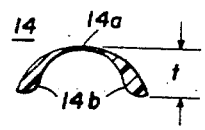
FIGURE 4 is a sectional view taken along the line 4—4 of FIGURE 1.

With reference to FIGURE 4, the unstressed configuration of the tabs 14–17 necessary to provide for flattening upon insertion into the ports is illustrated by the cross section of tab 14. The tab 14 is arcuate in cross section, with its central portion 14a somewhat thinner than its ends 14b.

The radial thickness of the tab 14 is indicated by the reference letter $t$. This thickness $t$ should be greater than the radial width of the port into which the tab 14 is to be inserted.

Figure 5:
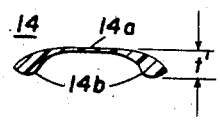
FIGURE 5 is a sectional view illustrating the section shown in FIGURE 4 when the embodiment of FIGURE 1 is deformed by installation on an automobile wheel.

FIGURE 5 illustrates the deformation of tab 14 resulting from its insertion into a port as shown in FIGURE 3. The central portion 14a of tab 14 is flexed so that the deformed radial thickness, indicated by the reference letter $t'$, is reduced to the radial width of the port.

The restraining forces are present at the points of contact of portion 14a with the wheel rim 24 and of ends 14b with the mounting plate 26.

The balancer 10 in FIGURE 1 is shown with four equally spaced tabs 14–17. It is to be understood, of course, that the casing 12 may be provided with as many tabs such as 14–17 as there are ports on the wheel to which the balancer 10 is to be applied, and that the spacing of the tabs on the casing 12 and the ports on the wheel should correspond.

Figure 6:
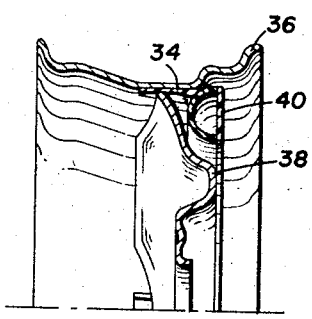
FIGURE 6 is a partial sectional view of another embodiment of the present invention installed on an automobile wheel.

Another embodiment of the balancer is illustrated in position on a wheel in the sectional view of FIGURE 6. A tab 34 is inserted in a narrow port between wheel rim 36 and wheel plate 38. The tab 34 and its relation to the port are similar to that described for tabs 14 and 16 in FIGURE 3.

In this embodiment, however, the casing 40 has a semicircular cross section. Thus the casing 40 does not extend as far out from the plate 38 as the circular casing 12 does from plate 26 in FIGURE 3.

Such a saving of space as accomplished by the modified cross section of casing 40 may be necessary to permit some conventional wheel covers to be placed on the wheel.

We claim:
1. In a wheel balancer for use on a wheel having a plurality of narrow ports between the wheel disc and the tire rim spaced circumferentially thereabout, which balancer includes an annular tubular casing containing weight movable means and a damping fluid, the improvement comprising:
   a plurality of integral elastic tabs on said casing, said tabs being semicircular in cross section in a plane parallel to said casing and having an axially extending outer surface parallel to the longitudinal axis of said casing, said tabs being circumferentially spaced about said casing for deformable insertion into said ports.
2. The balancer of claim 1 wherein the radial thickness of said tabs is greater than the radial width of said ports.
3. The balancer of claim 1, wherein:
   said casing is circular in cross section.
4. The balancer of claim 1, wherein:
   said casing is semi-circular in cross section.

References Cited

UNITED STATES PATENTS

| | | | |
|---|---|---|---|
| 2,279,333 | 4/1942 | Lyon | 301—37 |
| 3,063,754 | 11/1962 | Pierce | 301—5 |
| 3,256,044 | 6/1966 | Fisher | 301—63 |

RICHARD J. JOHNSON, *Primary Examiner.*

U.S. Cl. X.R.

301—37